United States Patent [19]

Sears

[11] Patent Number: 4,607,527

[45] Date of Patent: Aug. 26, 1986

[54] METHOD AND APPARATUS FOR SENSING ROTATION OF A DIAL ARM OF A UTILITY METER

[76] Inventor: Lawrence M. Sears, 3263 Glencairn Rd., Shaker Heights, Ohio 44122

[21] Appl. No.: 562,423

[22] Filed: Dec. 19, 1983

[51] Int. Cl.⁴ ............................................. G01F 15/14
[52] U.S. Cl. ................................. 73/432 A; 235/91 R; 340/870.2
[58] Field of Search .................... 73/272 A, 432 A; 340/870.02, 870.19; 235/91 R, 91 M

[56] References Cited

U.S. PATENT DOCUMENTS 2,351,081  6/1944  Swift .............................. 340/870.02
3,478,342  11/1969  Alldritt et al. ................. 340/870.02
4,204,115  5/1980  Boldridge ...................... 340/870.02

FOREIGN PATENT DOCUMENTS 2432704  4/1980  France .............................. 73/432 A Primary Examiner—Peter Chin
Attorney, Agent, or Firm—Yount & Tarolli

[57] ABSTRACT

Trip devices are disclosed for attachment to existing utility meters to detect revolutions of a dial arm of the meter. Two embodiments are disclosed, each including a spring-biased shaft extending through a base and a shoe on the end of the shaft. As the dial arm rotates, it catches and deflects the shoe, thus rotating the shaft. The shoe then slips off of the dial arm and returns to its original position under the urging of the spring. In one embodiment, shaft rotation is detected using a magnet and reed switch arrangement. In the other a mercury switch is instead used.

15 Claims, 6 Drawing Figures

METHOD AND APPARATUS FOR SENSING ROTATION OF A DIAL ARM OF A UTILITY METER

BACKGROUND AND FIELD OF THE INVENTION

The present invention relates to method and apparatus for sensing passage of a moving element, and more particularly to method and apparatus for detecting revolutions of a dial arm of a utility meter.

Metering devices are used by utility companies to register the amount of gas, electricity, water, etc. consumed by residential users. These utility meters generally are mechanical devices having a meter face including a number of dials which register utility usage in increments of tens of units, hundreds of units, thousands of units, etc. Such utility meters, most notably gas meters but also water and electric meters, are generally located inside the private homes of the residential customers and are therefore not readily accessible to utility company employees. The meter readings must be periodically taken, however, in order to check the amount of utility usage and determine the appropriate bill to be forwarded to the customer. This is troublesome for both the customer and the utility company.

It has long been recognized that it would be preferable if the readout of the utility meter were mounted outside of the customer's home. The utility meter reader would then have unimpeded access to the meter, and the number of occasions upon which the customer would have to be disturbed by the utility company would be substantially reduced. Unfortunately, it would be prohibitively expensive for a utility company to replace existing, internal utility meters with other meters capable of being read from outside the customer's residence.

One other method of accomplishing the same goal would be to modify existing utility meters in such a manner that utility usage could be read from outside of the customer's residence. Such a retrofit system is described in the corresponding U.S. patent application of Sears, Ser. No. 311,531, filed Oct. 15, 1981. In the system described in that patent application, a small trip device is mounted on the face of the existing utility meter. The trip device is tripped by one of the dial arms of the meter face, once each revolution, and provides one electrical pulse each time it is thus tripped. The electrical pulses are applied to a counting circuit which thus accumulates a count representative of utility usage. The counter can easily be coupled to an external readout so that the accumulated count can be read from outside of the customer's home.

SUMMARY OF THE INVENTION

The present invention provides other trip devices for detecting utility usage by detecting revolutions of a dial of the utility meter.

In accordance with the present invention, apparatus is provided for detecting revolutions of a dial arm of a utility meter, where the dial arm is located on the dial face of the meter and is covered by a transparent face plate. The apparatus comprises a base affixable over a hole in the transparent face plate at a location close to but offset transversely from the dial arm. A rotatable shaft extends through the base and the hole in a direction substantially normal to the face plate. A shoe is joined to and is rotatable with the portion of the shaft which extends beyonds the base toward the dial face. The shoe is radially elongated. Resilient means is included for rotationally biasing the shaft toward a first angular position wherein the shoe projects into the path of rotation of the dial arm. Thus, as the dial arm rotates, it abuts the shoe, forces it to a second angular position, and then releases it, enabling the shoe to return to the first angular position under the resilient urging of the resilient means. First means is joined to, and is rotatable with, the portion of the shaft which extends beyonds the base and away from the dial face, where the first means is rotated from a third to a fourth angular position by the shaft as the shoe is rotated from the first to the second angular position. Second means is attached to the base adjacent to the first means such that as the first means rotates between the third and fourth angular positions, it also moves relative to the second means. One of the first and second means is a magnet, and the other is a magnetic reed switch. The reed switch changes between open and closed states as the first means moves relative to the second means, due to changing proximity with the magnet.

In another embodiment of the present invention, the first and second means are deleted, and are replaced by a position sensitive switch means. The position sensitive switch means (which may, for example, be a mercury switch) is coupled to the portion of the shaft which extends beyond the base and away from the dial face. The position sensitive switch means is rotated from a third to a fourth angular position by the shaft as the shoe is rotated from the first position to the second angular position. The orientation of the position sensitive switch means is selected such that the switch means has a first state when in said third angular position and second state when in said fourth angular position.

In accordance with another aspect of the present invention, means is provided for generating an electrical signal having a level dependent upon the state of the switch means associated with the apparatus. Thus, the electrical signal has pulses in it formed by the opening and closing of the switch means. The electrical pulses can easily be counted to provide an electrical "count" signal indicative of utility usage. The electrical "count" signal can readily be communicated to outside of the customer's home, where it is accessible for reading.

Apparatus such as described above can be produced inexpensively, can easily and conveniently be mounted on existing meters, and will be reliable in use. Furthermore, it does not block the meter face, hence a utility employee can still read the meter in a conventional manner without removing the device. The apparatus, in short, exhibits all of the desired attributes of a retrofit device.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION

Figure 1:
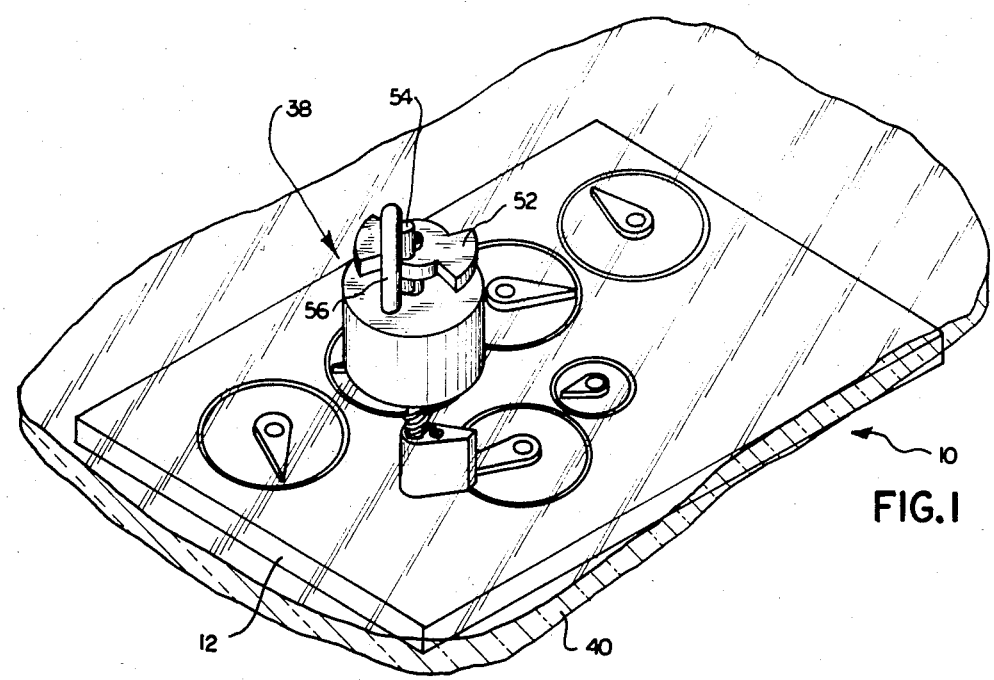
FIG. 1 is a perspective illustration of one embodiment of a device in accordance with the teachings of the present invention, as mounted on the face of a utility meter.
Figure 2:
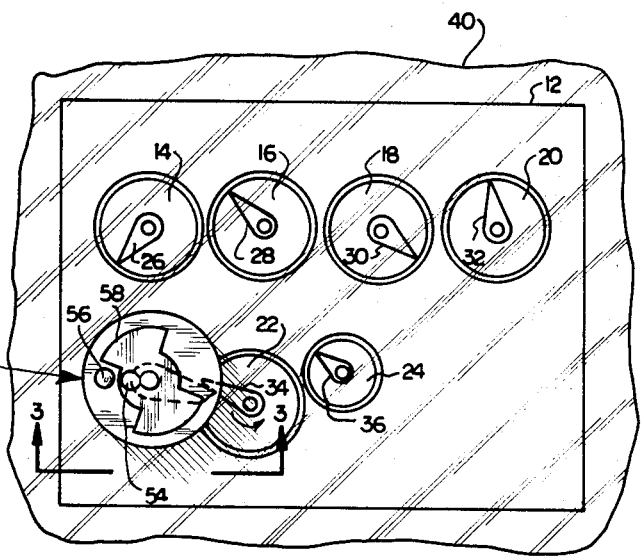
FIG. 2 is a plan view of the apparatus shown in the perspective of FIG. 1.
Figure 3:
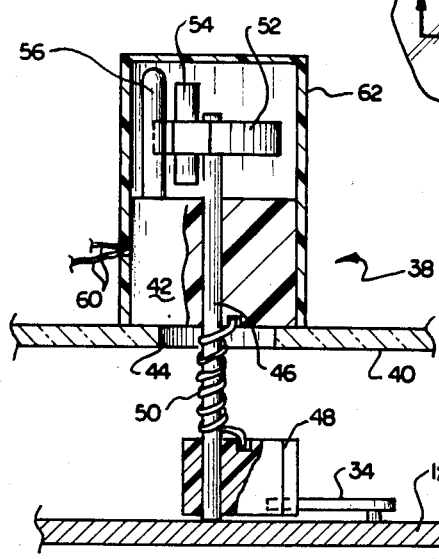
FIG. 3 is an elevation view, partly in section, taken along lines 3—3 of FIG. 2.

A portion 10 of a conventional utility meter, such as a gas meter, is shown in FIGS. 1, 2 and 3. The utility meter includes a dial face 12 upon which are mounted several dials 14, 16, 18, 20, 22 and 24. The meter mechanism causes the dials to rotate in response to utility usage. Each dial includes a corresponding dial arm 26-36, all of which are coupled together by a gearing mechanism located beneath the face plate 12 and not shown in the Figures. The dials 14, 16, 18 and 20 are geared to one another such that each dial arm rotates at 1/10th the rate of its nearest righthand neighbor. Presuming the meter registers amounts of usage of natural gas, the dial 20 may indicate hundreds of cubic feet used by the customer, the dial 18 thousands of cubic feet, and the dials 16 and 14, respectively, tens of thousands and hundreds of thousands of cubic feet of gas used. The remaining two dials 22 and 24 would then indicate smaller increments of utility usage. For example, the dial arm 36 may rotate one full revolution for each half cubic foot of usage, whereas the dial arm 34 may rotate one full revolution for each two cubic feet of gas used by the customer.

In accordance with the present invention, a trip device 38 is fastened to the transparent window 40 covering the meter dial face 12. The device 38 is tripped once in each revolution of a selected dial arm of the utility meter, and provides an electrical pulse in response to being thus tripped. As shown in the Figures, the trip device 38 includes a pill-shaped base 42 which is adapted to be glued or otherwise fastened over a suitable hole 44 cut in the face plate 40 covering the meter face 12. A shaft 46 extends through the base material 42 in a direction substantially normal to the orientation of the face plate 12. The shaft 46 is long enough that it protrudes from both sides of the base 42. The shaft is, moreover, rotatable within the base 42. A shoe 48 is rigidly affixed to the portion of the shaft 46 nearest the dial face 12. The shoe 48 is rotationally biased by a coil spring 50. The spring 50 is coaxial with the shaft 50 and extends between the base 42 and the shoe 48. The opposing ends of the spring 50 are anchored, respectively, in the base 42 and the shoe 48. Rotation of the shaft therefore causes either winding or unwinding of the spring. The coils of the spring are open, when relaxed, whereby the spring can be compressed in an axial direction. The distance separating the base 42 and the shoe 48, with the spring uncompressed, is somewhat greater than the distance separating the base 42 from the dial face 12. Consequently, as the base 42 is inserted over, and into abutment with, the face plate 40, the shaft 46 first abuts the dial face 12 and then slides axially through the base 42, compressing the spring 50. The compressed spring imparts an axial pressure upon the shaft 46, which forces it to remain in abutment with the dial face 12. The base 42 is held in place on the face plate 40 by a suitable epoxy cement or other glue.

The axial freedom of movement of the shaft 46 enables the device to automatically compensate for meter-to-meter variation in the distance between the meter face 12 and the window 40. On each meter, the spring 50 forces the shaft 46 into proper axial abutment with the meter face 12. Thus, the same device can be used with meters differing in meter face/window spacing by as much as one-half of an inch or more.

The axial movement of the shaft also affects the axial relationship between the magnet 54 and reed switch 56. Proper actuation of the reed switch 56 is assured, however, by the relatively extended length of the bar magnet 54.

A wafer 52 is press-fit over the outside end of the shaft 46. The shaft 46 is normal to the plane of the wafer, whereby the wafer 52 is essentially parallel to the dial face 12. A bar magnet 54 is carried by the wafer 52. The bar magnet 54 fits through a hole in the wafer such that it is radially spaced from the shaft 46, but is substantially parallel to the shaft. Thus, the magnet follows an arc around the shaft 46 when the shaft rotates. A magnetic reed switch 56 is attached to the base 42 in an orientation parallel to the orientation of the bar magnet 54. The wafer 52 has a radially projecting tab 58 which extends outward by a radial distance greater than the radial spacing of the reed switch 56 from the shaft 46. Thus, as the shaft 46 rotates counterclockwise, the wafer 52 eventually rotates to a position wherein the tab 58 catches the reed switch 56. The tab prevents further counterclockwise rotation. The spring 50 rotationally biases the shaft 56 towards the position wherein the wafer tab 58 abuts the reed switch 56.

The trip device 38 will preferably be fully assembled before being installed on a utility meter. When the trip device 38 is assembled, the shaft 46 (minus the wafer 52) is first twisted in a clockwise direction to pre-bias the spring 50. The wafer 52 is then inserted over the shaft 46. Because of the pre-bias, the spring 50 resiliently urges the wafer, and thus the bar magnet 54, in a counterclockwise direction. The rotation in the counterclockwise direction is limited, however, by contact between the reed switch 56 and the projecting tab 58. An enclosure 62 (shown only in FIG. 3) is slipped over the completed trip device, covering the reed switch 56, magnet 54, wafer 52, and base 42. The enclosure has the general shape of an inverted cup, and includes a cylindrical outer wall and a flat top. The inner diameter of the cylindrical wall matches the outer diameter of the pill-shaped base 42. Glue is spread on the perimeter of base 42 before the enclosure 62 is slipped over it. The glue fastens the enclosure over the trip device and forms a hermetic seal between the enclosure and the base.

The installation of the trip device on a meter is accomplished without removing or replacing any element of the existing meter. In fact, the only alteration necessary to the meter is the drilling of a hole 44 in the glass face plate 40 covering the meter dials. The hole is drilled at a location close to, but transversely spaced from, the dial 22. The hole 44 is large enough to admit the shoe 48, but is still small enough that the base 42 can completely cover it. The trip device 38 is then installed on the meter by inserting the shoe through the opening 44, and then rotating and translating the entire device so that the tip of the shoe 48 protrudes into the path of rotation of the dial arm 34, as shown in FIG. 2. Proper axial alignment of the shoe is insured by the axial pressure applied to the shaft 46 by the spring 50. As stated previously, the base is held on the face plate by a suitable glue. The glue forms a hermetic seal between the base 42 and face plate 40.

When the trip device is properly installed, the dial arm catches the shoe 48 once each revolution. As the dial arm 34 rotates, it displaces the shoe in a clockwise direction, thereby also rotating the wafer 52 relative to the reed switch 56. Upon further rotation, the shoe slips off the dial arm and springs back in a counterclockwise direction under the urging of the spring 50. The shaft 46 therefore returns to its original position (i.e., to the position where the tab 58 projecting from the wafer 52 abuts the magnetic reed switch 56). The shoe 48 preferably has a beveled edge, as shown in the figures, to insure that it does not hang up on the dial arm 34 after its leading edge is initially released.

Thus, one time in each revolution of the dial arm 34, the magnet 54 is rotated away from its position proximate the magnetic reed switch 56 to a second rotational position further from the reed switch 56. The state of the reed switch 56 (i.e., open or closed) is dependent upon how close the magnet 54 is to it. The magnetic reed switch 56 is closed when the magnet 54 is in its normal, undeflected position adjacent the reed switch 56. The second rotational position of the magnet 54, however, is far enough from the reed switch 56 that the electrical contacts of the reed switch are then open. The reed switch thus opens, and then recloses again, once in each revolution of the dial arm 34. The electrical contacts of the magnetic reed switch 56 are connected to wires 60. The wires 60 couple the trip device to electronic counting circuitry, a block diagram of which is shown in FIG. 4.

Figure 4:
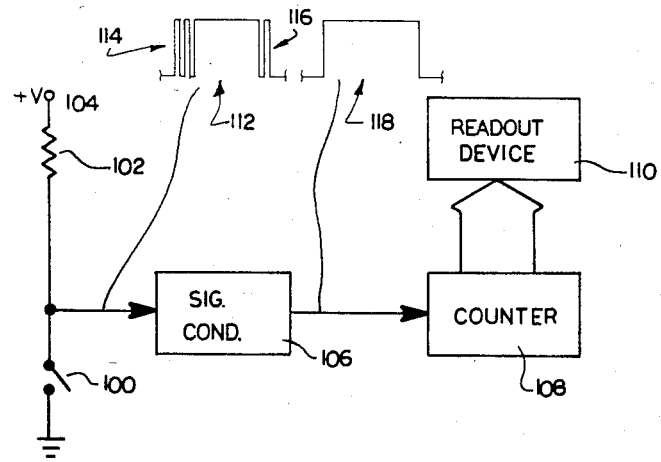
FIG. 4 is a block diagram of one form of utility usage registering device to which the apparatus of the present invention could be coupled.

The magnetic reed switch is indicated at 100 in FIG. 4. In FIG. 4, one of the contacts in the magnetic reed switch is grounded, and the other is connected to a voltage source terminal 104 through a resistor 102. The voltage at the junction between the resistor 102 and the reed switch 100 is dependent upon the state of the reed switch. As long as the switch 100 is closed, the junction between the resistor 102 and the reed switch 100 is at ground potential. When the magnet rotates away from the reed switch, however, the switch opens and the voltage at the junction between the resistor 102 and the reed switch 100 rises to a potential approximately equal to the potential appearing at the terminal 104.

Ideally, the switch 100 will open when the magnet rotates away from the switch, and will remain open until the magnet returns. Then, when the magnet returns to its original position, the switch will close and remain closed until next the dial arm 34 engages the shoe 48. Therefore, in the ideal case, a single, well defined pulse will be generated each time the device 38 is tripped by the dial arm 34. In practice, however, the switch contacts bounce both upon switch opening and switch closure. Thus, the electrical pulse 112 produced by the switch is corrupted by unwanted impulses both at its rising edge 114 and its falling edge 116.

The signal appearing at the junction between the resistor 102 and the reed switch 100 is applied to a signal conditioning circuit 106. The conditioning circuit 106 filters and processes the signal such that a single, noise-free pulse is provided each time the device 38 is tripped by the dial arm 34. The signal conditioner 106 includes a retriggerable one shot circuit having a time constant longer than the period of the contact bounce experienced by the reed switch 100. The output of the one shot circuit is the output of the signal conditioner 106, and will include pulses 118 having well-defined, noise-free rising and falling edges. The pulses produced by the signal conditioner 106 are applied to the input of an electronic counter 108. The counter 108 counts the pulses as they occur, and provides a running total to a read out device 110. Preferably, the read out device 110 will be mounted outside of the customer's house so that the meter reader can record the counter reading (which is representative of utility usage) without entering the customer's home.

Figure 5:
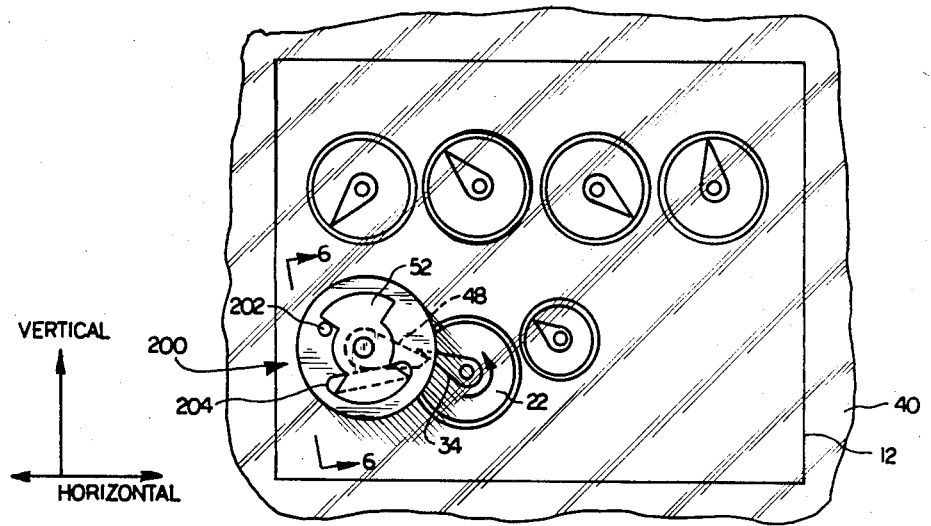
FIG. 5 is a plan view of a second embodiment of the apparatus in accordance with the teachings of the present invention, as mounted on the face of a utility meter.
Figure 6:
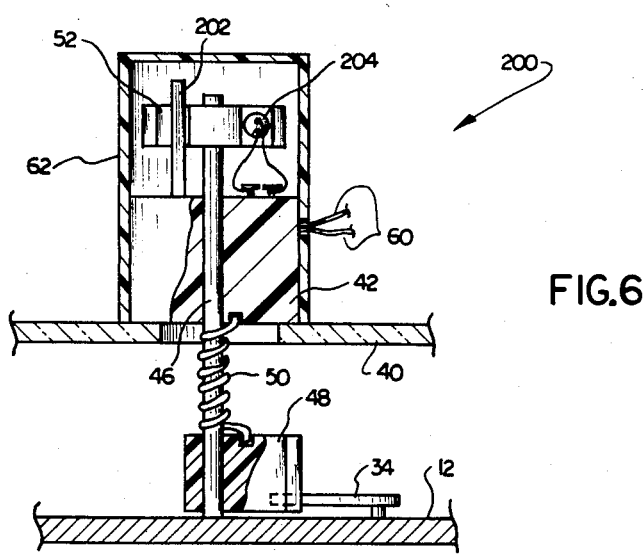
FIG. 6 is an elevation view, again partly in section, taken along lines 6—6 of FIG. 5.

FIGS. 5 and 6 are respectively plan and elevation views of a second embodiment of the trip device in accordance with the teachings of the present invention. The second embodiment includes many of the same elements included in the first embodiment. For simplicity of description and understanding, elements of the second embodiment which correspond to similar elements of the first embodiment have been identified by corresponding reference numerals. In the present embodiment it is presumed that the utility meter to which the trip device is attached is mounted such that vertical and horizontal directions are as indicated in FIG. 5.

In the embodiment shown in FIGS. 5 and 6, a trip device is provided which includes a base 42, shaft 46, shoe 48, spring 50, wafer 52, and output leads 60. In the embodiment of FIGS. 5 and 6, however, the magnetic reed switch 56 is replaced by a stop bar 202, and the bar magnet is eliminated altogether. Instead, the wafer 52 carries a mercury switch 204. The mercury switch passes through the wafer in a direction parallel to the plane of the wafer, and substantially transverse to the axis of the shaft 46.

The mercury switch, per se, is conventional. It includes a hollow elongated glass capsule within which is contained a small globule of liquid mercury. Near one end, two small contacts project through the capsule wall and into the enclosed cavity. The interior ends of the two contacts are separated by a small air gap sufficient to normally maintain good electrical isolation between them. The switch is then "open". If the mercury globule rolls into the end containing the contacts, however, it shorts the two contacts together, thus "closing" the switch. The state of the switch is therefore dependent upon the location of the mercury globule, which in turn is dependent upon the orientation of the switch relative to horizontal. In the embodiment shown in FIGS. 5 and 6, mercury switch 204 is normally (i.e., when undisturbed by the dial arm 34) positioned with its contact-bearing end lower than its other end. Thus, gravity forces the mercury to roll to the contact-bearing end of the switch, closing the switch. This result is achieved by orienting the stop bar 202 and wafer 52 such that the wafer 204 is normally slightly counterclockwise of the position which would place mercury switch 204 in a horizontal orientation.

As the dial arm 34 rotates in a counterclockwise direction, it catches the shoe 48, causing the shoe 48 and shaft 46 to rotate. The wafer 52, which is rigidly coupled to the shaft 46, therefore also rotates in the same clockwise direction. Thus, the mercury switch is rotated from an orientation wherein the mercury covers both contacts (switch closed) through a horizontal orientation, to an orientation wherein the mercury rolls off of the contacts and thereby opens the switch. As the dial arm 34 rotates further, the shoe 48 slips off of it and the wafer returns in a counterclockwise direction, stopping only when the tab projecting from wafer 52 strikes the stop bar 202. The counterrotation of the wafer returns mercury switch 204 to its normal, closed state.

Leads 60 are connected to the two contacts of mercury switch 204. The leads 60 are long enough that they do not restrict either axial or radial movement of the mercury switch. The leads therefore do not interfere with the automatic axial positioning feature described previously with respect to FIGS. 1-3. Leads 60 are connected to the two contacts of mercury switch 204. The leads 60 connect the switch to electronic circuitry such as that shown in FIG. 4. Thus, each time the mercury switch is tripped by the dial arm 34, the signal conditioner 106 provides a single electrical pulse. The pulses are counted in the counter 108, which provides a running total to a readout device 110 for use by the meter reader.

Although the invention has been described with respect to a preferred embodiment, it will be appreciated that various rearrangements and alterations of parts may be made without departing from the spirit and scope of the present invention, as defined in the appended claims.

What is claimed is:

1. Apparatus for detecting revolutions of a dial arm of a utility meter, said dial arm being located on a dial face of said meter and covered by a transparent face plate, said apparatus comprising:
   a base affixable over a hole in said transparent face plate at a location close to but offset transversely from said dial arm,
   a rotatable shaft having an axis of rotation and extending through said base, for rotation about said axis, and said hole in a direction substantially normal to said face plate,
   a shoe joined to, and rotatable with, the portion of said shaft which extends beyond said base towards said dial face, said shoe being radially elongated,
   resilient means for rotationally biasing said shaft in a first direction about said axis towards a first angular position relative to said base wherein said shoe projects into the path of rotation of said dial arm, whereby, as said dial arm rotates, it abuts said shoe, forces it to rotate in a second direction opposite to said first direction about said axis to a second angular position relative to said base, and then releases it, enabling the shoe to then return to said first angular position under the resilient urging of said resilient means,
   first switch means joined to, and rotatable with, the portion of said shaft which extends beyond said base and away from said dial face, said first switch means being rotated in said second direction from a third to a fourth angular position, respectively corresponding to said first and second angular positions, relative to said base by said shaft as said shoe is rotated from said first to said second angular position, and
   second switch means attached to said base adjacent said first switch means such that as said first switch means rotates between said third and fourth angular positions it also moves relative to said second switch means,
   one of said first and second switch means is a magnet and the other is a reed switch, said reed switch having switch open and switch closed states and changing between said open and closed states as said first switch means moves relative to said second switch means, due to changing proximity with said magnet.

2. Apparatus as set forth in claim 1, wherein said first switch means comprises a bar magnet and said second switch means is said reed switch.

3. Apparatus as set forth in claim 1, wherein said resilient means comprises a spring coaxially disposed on said shaft and having one end anchored in a fixed rotational position relative to said shaft and the other end anchored in a fixed rotational position relative to said base such that rotation of said shaft causes torquing of said spring.

4. A trip assembly for detecting revolutions of a dial arm of a utility meter, comprising:
   a base,
   a rotatable shaft having an axis of rotation and extending entirely through said base,
   resilient means for resiliently urging said shaft to rotate in a first direction about said axis,
   rotational stop means for preventing said shaft from rotating in said first direction beyond a first angular location relative to said base in said first direction,
   an elongated shoe extending radially from one end of said shaft and rotatable with it, said shoe being adapted to briefly catch and then release said dial arm of said utility meter once in each revolution of said dial arm,
   first switch means attached to the other end of said shaft and rotatable with it about said axis,
   second switch means fixedly attached relative to said base at a location selected such that the spacing between said first and second switch means changes as said shaft
   one of said first and second switch means is a magnet and the other is a magnetic field responsive switch means which switches from a first state to a second state as said spacing between said first and second means changes due to rotation of said shaft.

5. A trip assembly as set forth in claim 4, wherein said first means comprises a bar magnet and said second means comprises a reed switch.

6. A trip assembly as set forth in claim 4, and further comprising third means coupled to said switch means for providing an electrical signal having a value dependent upon the state of said switch means, said third means thus providing an electrical pulse each time said dial arm briefly catches and then releases said shoe.

7. A trip assembly as set forth in claim 6, and further comprising means for counting said electrical pulses provided by said third means so as to thereby accumulate a count representative of utility usage.

8. A trip assembly for detecting revolutions of a dial arm of a utility meter, comprising
   a base,
   a rotatable shaft having an axis of rotation extending entirely through said base,
   resilient means for resiliently urging said shaft to rotate in a first direction about said axis,
   rotational stop means for preventing said shaft from rotating beyond a first angular location relative to said base in said first direction,
   an elongated shoe extending radially from one end of said shaft and rotatable about said axis with it, said shoe being adapted to briefly catch on and then be released by said dial arm of said utility meter once in each revolution of said dial arm, when said trip assembly is mounted on a utility meter, a position sensitive switch means attached to the other end of said shaft and rotatable in a second direction opposite said first direction about said axis between a first orientation and a second orientation, said switch means having an open state and a closed state and being in one of said states when in said first orientation and being in the other of said states when in said second orientation, said switch means is normally in said first orientation and shifts to said second orientation when said shoe is caught by said dial arm during its rotation.

9. A trip assembly as set forth in claim 8, wherein said position sensitive switch means comprises a mercury switch.

10. A trip assembly as set forth in claim 8, wherein said position sensitive switch means includes an elongated hollow capsule having two contacts fixed at one end thereof and a globule of an electrically conductive liquid contained therein, and wherein said switch means is attached to said shaft with its length dimension being substantially perpendicular to the axis of said shaft, such that when said assembly is mounted with said shaft horizontally disposed, rotation of said shaft causes said electrically conductive globule to move from one end of said capsule to the other, thereby changing the state of said switch means.

11. A trip assembly as set forth in claim 8, wherein said resilient means comprises a spring coaxially disposed on said shaft and having one end anchored to said shaft and the other end anchored to said base, whereby rotation of said shaft causes torquing of said spring.

12. Apparatus for detecting revolutions of a dial arm of a utility meter, said dial arm being located on a dial face of said meter and covered by a transparent face plate, said apparatus comprising:

a base affixable over a hole in said transparent face plate at a location close to but offset transversely from said dial arm, a rotatable shaft having an axis of rotation and extending through said base and said hole in a direction substantially normal to said face plate, a shoe joined to, and rotatable about said axis with, the portion of said shaft which extends beyond said base towards said dial face, said shoe being radially elongated, resilient means for rotationally biasing said shaft in a first direction towards a first angular position about said axis relative to said base wherein said shoe projects into the path of rotation of said dial arm, whereby, as said dial arm rotates, it abuts said shoe, forces it to rotate in a second direction opposite to said first direction about said axis to a second angular position relative to said base, and then releases it, enabling the shoe to then return to said first angular position under the resilient urging of said resilient means, position sensitive switch means joined to, and rotatable about said axis with, the portion of said shaft which extends beyond said base and away from said dial face, said position sensitive switch means being rotated in said second direction from a third to a fourth angular position, respectively corresponding to said first and second annular positions, relative to said base as said shoe is rotated from said first to said second angular position, said switch means having an open state and a closed state.

13. Apparatus as set forth in claim 12, wherein said switch means is a mercury switch.

14. Apparatus as set forth in claim 12, and further comprising circuit means coupled to said switch means for providing an electrical signal having a value dependent upon the state of said switch means, said circuit means thus providing an electrical pulse each time said dial arm briefly catches and then releases said shoe.

15. Apparatus as set forth in claim 14, and further comprising means for counting said electrical pulses provided by said circuit means so as to thereby accumulate a count representative of utility usage.

* * * * *